(12) United States Patent
Davidian

(10) Patent No.: US 12,091,130 B2
(45) Date of Patent: Sep. 17, 2024

(54) ANTI-ROTATION PEG AND BRACKET ARRANGEMENT

(71) Applicant: Super73, Inc., Irvine, CA (US)

(72) Inventor: Karoline Davidian, Irvine, CA (US)

(73) Assignee: Super 73, Inc., Irvine, CA (US)

( * ) Notice: Subject to any disclaimer, the term of this patent is extended or adjusted under 35 U.S.C. 154(b) by 325 days.

(21) Appl. No.: 17/467,371

(22) Filed: Sep. 6, 2021

(65) Prior Publication Data

US 2023/0077306 A1    Mar. 9, 2023

(51) Int. Cl.
*B62M 3/08* (2006.01)
*B62J 25/00* (2020.01)

(52) U.S. Cl.
CPC ............... *B62M 3/08* (2013.01); *B62J 25/00* (2013.01)

(58) Field of Classification Search
CPC ... B62H 1/08; B62M 3/08; B62J 25/00; B62J 25/06
See application file for complete search history.

(56) References Cited

U.S. PATENT DOCUMENTS

| | | | |
|---|---|---|---|
| 5,638,729 A | 6/1997 | Zhang | |
| 6,129,370 A * | 10/2000 | Hsieh | B62J 25/06 74/564 |
| 6,142,499 A * | 11/2000 | Hsieh | B62J 25/06 280/304.5 |
| 6,149,177 A * | 11/2000 | Valdez | B62J 25/06 280/291 |
| 6,193,255 B1 * | 2/2001 | Lo | B62J 25/06 74/564 |
| 6,199,887 B1 * | 3/2001 | Lee | B62J 25/06 74/564 |
| 6,247,761 B1 * | 6/2001 | Lin | B25B 13/48 301/124.1 |
| 6,499,378 B1 * | 12/2002 | Ho | B62J 25/06 74/564 |
| 6,578,652 B1 * | 6/2003 | Kobacker, II | B62K 21/16 403/368 |
| 6,688,629 B2 * | 2/2004 | Essinger | B62J 25/06 180/219 |
| 10,745,074 B2 * | 8/2020 | Griffin | B62L 3/04 |
| 2006/0181054 A1 | 8/2006 | Colano | |

FOREIGN PATENT DOCUMENTS

| | | |
|---|---|---|
| CN | 105519103 | 9/2009 |
| CN | 101886655 | 11/2010 |
| RU | 2295992 | 3/2007 |
| WO | WO 2008/150682 | 12/2008 |

* cited by examiner

*Primary Examiner* — Tony H Winner
(74) *Attorney, Agent, or Firm* — Stradling Yocca Carlson & Routh

(57) ABSTRACT

An anti-rotation bracket configured to engage a horizontal indented vehicle component and fit within an indentation formed within a component attachable to the vehicle is presented. The anti-rotation bracket comprises a flat region having an opening formed therein, the flat region sized to fit within the indentation and an extension integrally formed at a right angle to the flat region, the extension sized to engage the horizontal indented vehicle component such that the extension abuts the horizontal indented vehicle component, thereby inhibiting rotation of the anti-rotation bracket.

20 Claims, 8 Drawing Sheets

ANTI-ROTATION PEG AND BRACKET ARRANGEMENT

BACKGROUND OF THE INVENTION

Field of the Invention

The present invention relates generally to brackets and attachment hardware, and more particularly brackets and attachment hardware used in bicycle, electronic motorbike, and/or scooter designs.

Description of the Related Art

Vehicles such as bicycles, electric motorbikes, and scooters typically include components to rest the user's feet. Bicycles and electric motorbikes employ foot pedals, where the user can propel the vehicle forward by moving his or her legs and feet on the pedals and drive rear wheel motion.

Such vehicles can be designed for children, where the child may wish to propel himself or herself along by having his or her feet contacting the ground and pedals are not employed. However, he or she may wish to deploy posts to rest his or her feet when traveling at higher speeds. Additionally, one user of such a youth vehicle may wish to have posts available at all times while others may wish to use retractable posts.

Up until this time, pegs and other similar devices have typically attached to bicycles, scooters, motorcycles, and so forth using a single bolt. The problem with a single bolt is that the peg or piece can rotate if the bolt is not secure. Lock washers have been employed, for example, but these can be limited and at times inconvenient, and rotation of the foot peg can still result.

It would be beneficial to offer a peg arrangement for use with a bicycle, electric motorbike, scooter, or similar vehicle that offers an ability to quickly and easily replace the peg with an alternate peg, such as from a fold-up peg to a non-folding peg or vice versa, without unwanted rotation should the joining mechanism become loose. Such a design may offer advantages over previously known vehicle foot peg designs.

SUMMARY OF THE INVENTION

According to one aspect of the present design, there is provided an anti-rotation bracket configured to engage a horizontal indented vehicle component and fit within an indentation formed within a component attachable to the vehicle. The anti-rotation bracket comprises a flat region having an opening formed therein, the flat region sized to fit within the indentation and an extension integrally formed at a right angle to the flat region, the extension sized to engage the horizontal indented vehicle component such that the extension abuts the horizontal indented vehicle component, thereby inhibiting rotation of the anti-rotation bracket.

According to another aspect, there is provided a vehicle comprising a horizontal indented vehicle component and an anti-rotation bracket configured to engage the horizontal indented vehicle component and fit within an indentation formed within a component attachable to the vehicle. The anti-rotation bracket comprises a flat region having an opening formed therein, the flat region sized to fit within the indentation and an extension integrally formed at a right angle to the flat region, the extension sized to engage the horizontal indented vehicle component such that the extension abuts the horizontal indented vehicle component.

According to a further aspect, there is provided an anti-rotation bracket configured to engage a horizontal indented vehicle component and fit within an indentation formed within a cylindrical component attachable to the vehicle. The anti-rotation bracket comprises a flat region having an opening formed therein, the flat region sized to fit within the indentation and an extension integrally formed at a right angle to the flat region, the extension sized to engage the horizontal indented vehicle component such that the extension abuts the horizontal indented vehicle component, thereby inhibiting rotation of the anti-rotation bracket. Securing the anti-rotation bracket within the indentation and proximate the horizontal indented vehicle component inhibits rotation of the cylindrical component.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

The present design is a peg arrangement that employs a unique L-shaped bracket that prohibits rotation when the peg is attached to the vehicle. A specific tab may be employed with a standard bolt, and a receiving member may include an indentation matching the L-shaped bracket.

Figure 1:
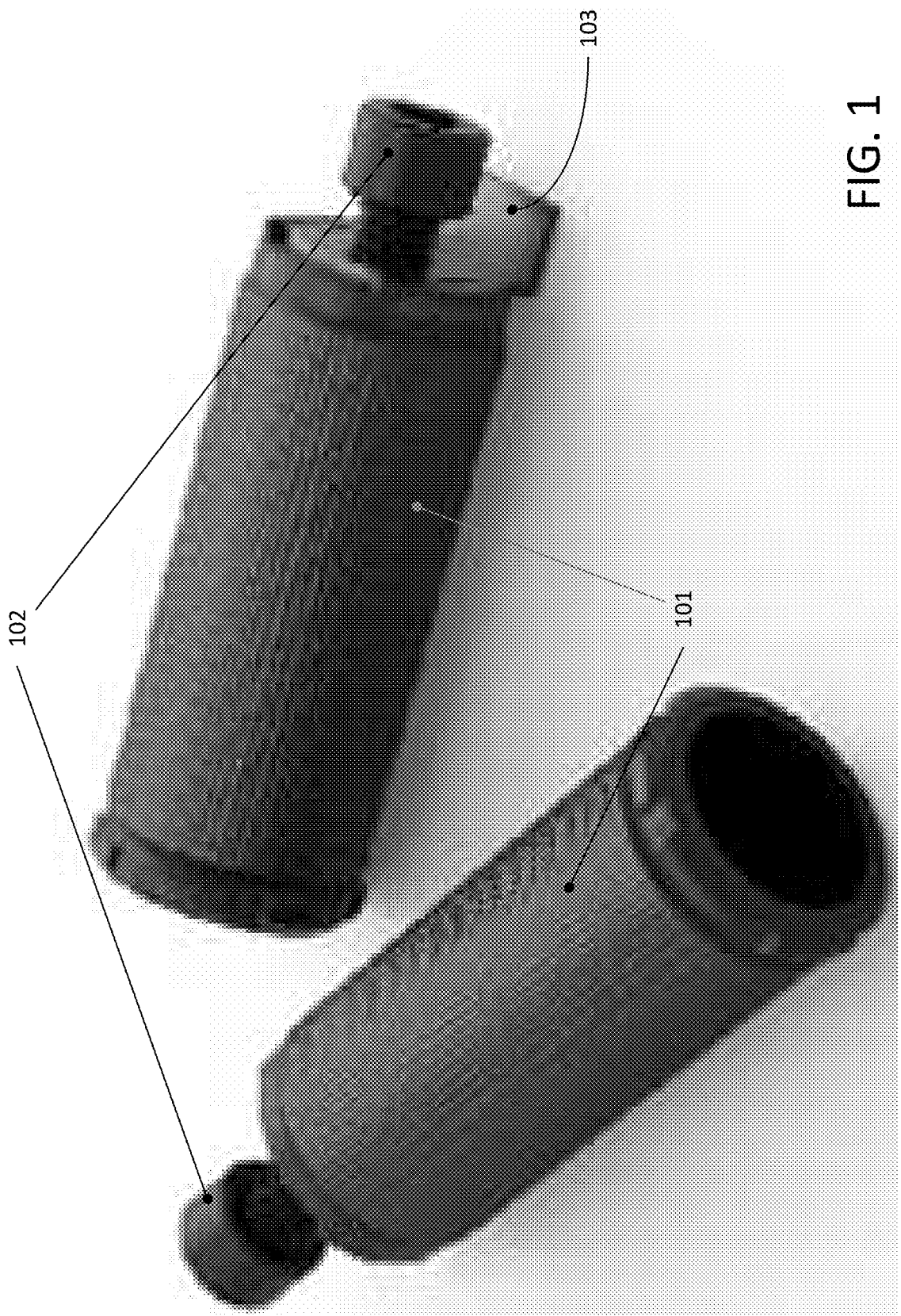
FIG. 1 is a view of a pair of fixed foot pegs including an anti-rotation bracket in accordance with the present design.
Figure 2:
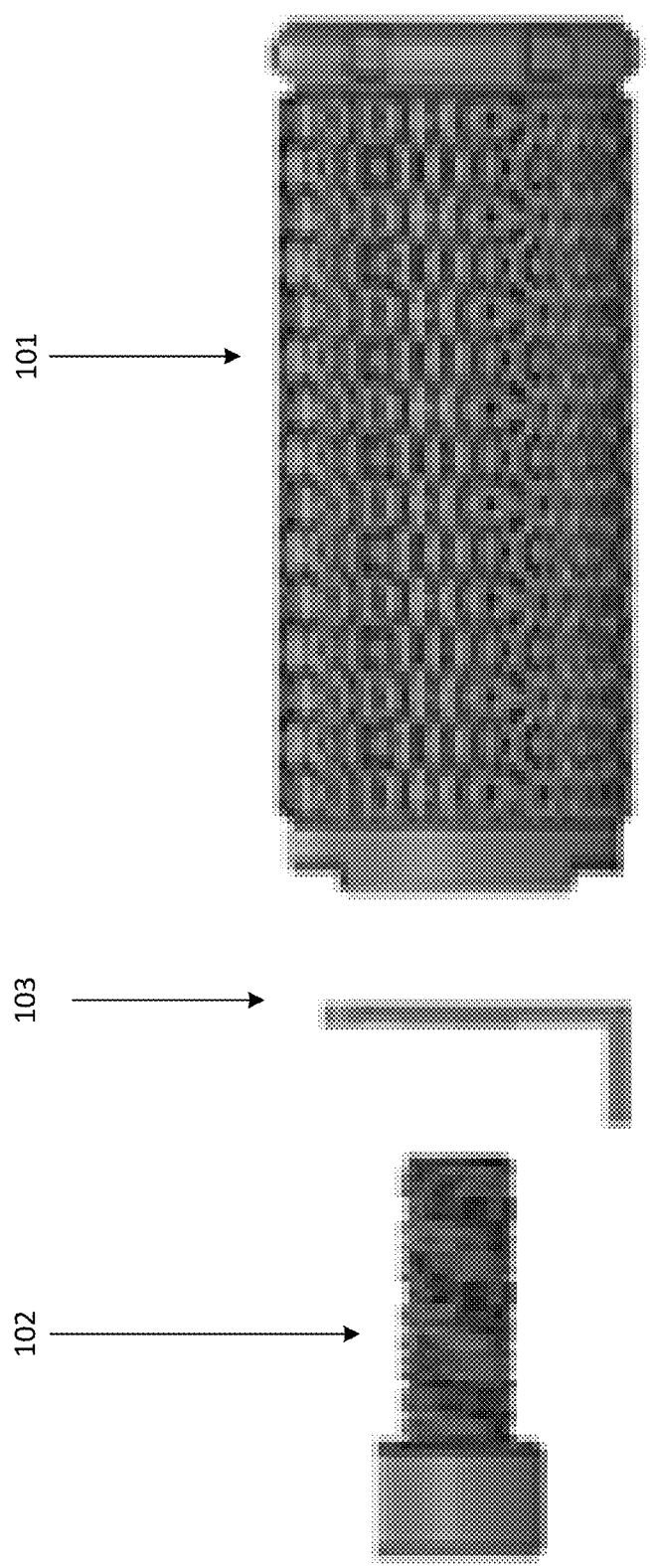
FIG. 2 is a side view of the components of the present fixed foot peg aspect of the design.

FIG. 1 shows a standard set of foot pegs for use with a vehicle. FIG. 1 shows the peg cylinder 101 and a bolt 102, and also shown in this view is an L-bracket 103 that fits within a complementary indentation (not shown) formed at the end of cylinder 101. FIG. 2 is a side view of the arrangement including bolt 102, L-bracket 103, and cylinder 101. Cylinder 101 may include an exterior component, such as a patterned rubber sleeve or piece joined to an internal cylindrical piece. While cylinder 101 is generally cylindrical in shape, other shapes may be employed, including shapes with one or more flat surfaces, indentations, and so forth.

Figure 3:
FIG. 3 illustrates an example of a vehicle that may be employed with the present design.
Figure 4:
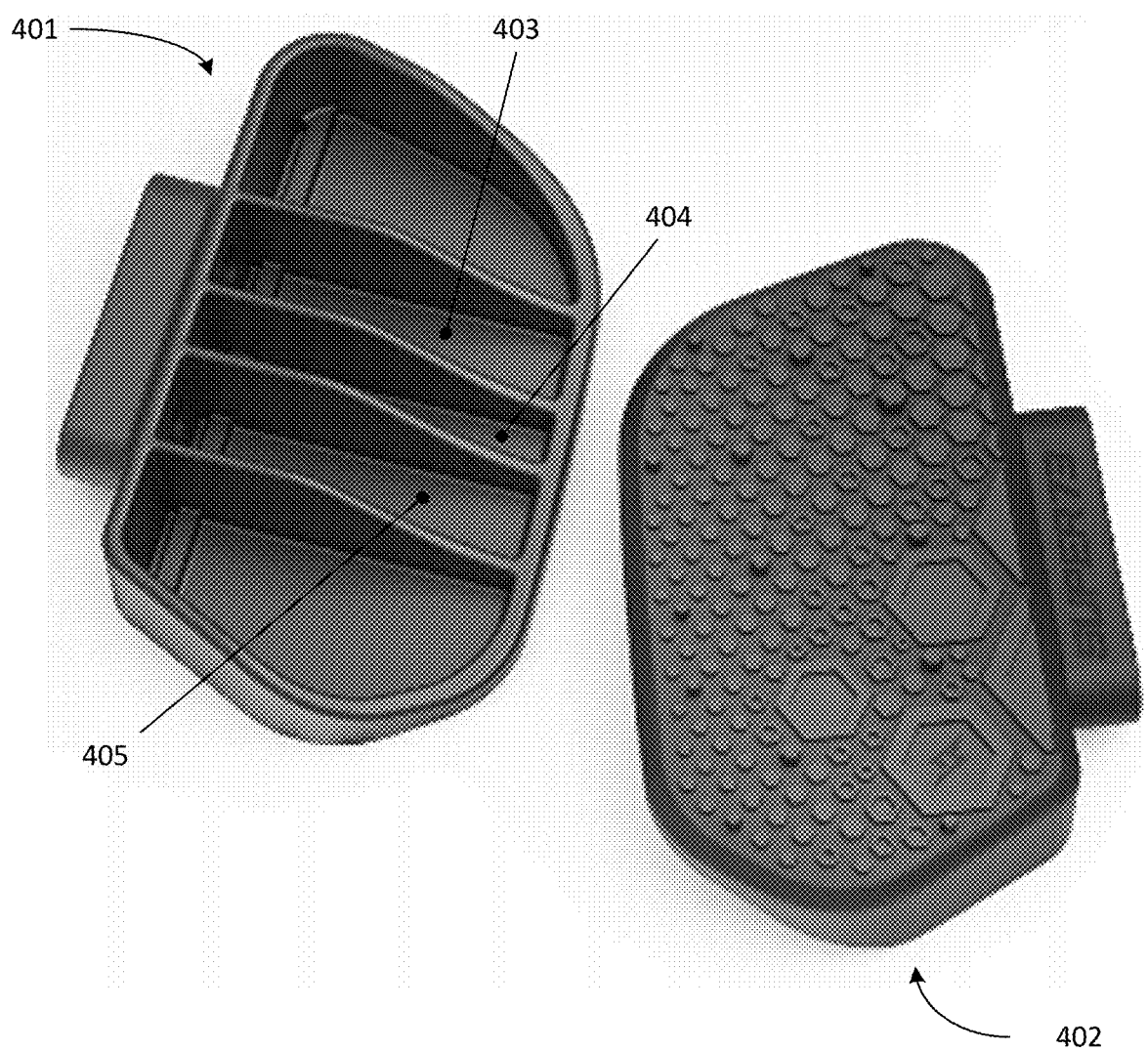
FIG. 4 shows example platforms that may be employed with the current design.

FIG. 3 is an overall view of a motorbike where the present design may be employed, including foot pegs (not shown in this view) covered by platforms such as platform 301 that a rider can use to position his or her feet in an off-ground orientation. In this view, frame 302 is shown, to which the pegs and present design may be attached. FIG. 4 illustrates example platforms 401 and 402, bottom and top views respectively. Cylinder 101 may fit within one of the three spaces 403, 404, or 405 formed in a platform.

Figure 5:
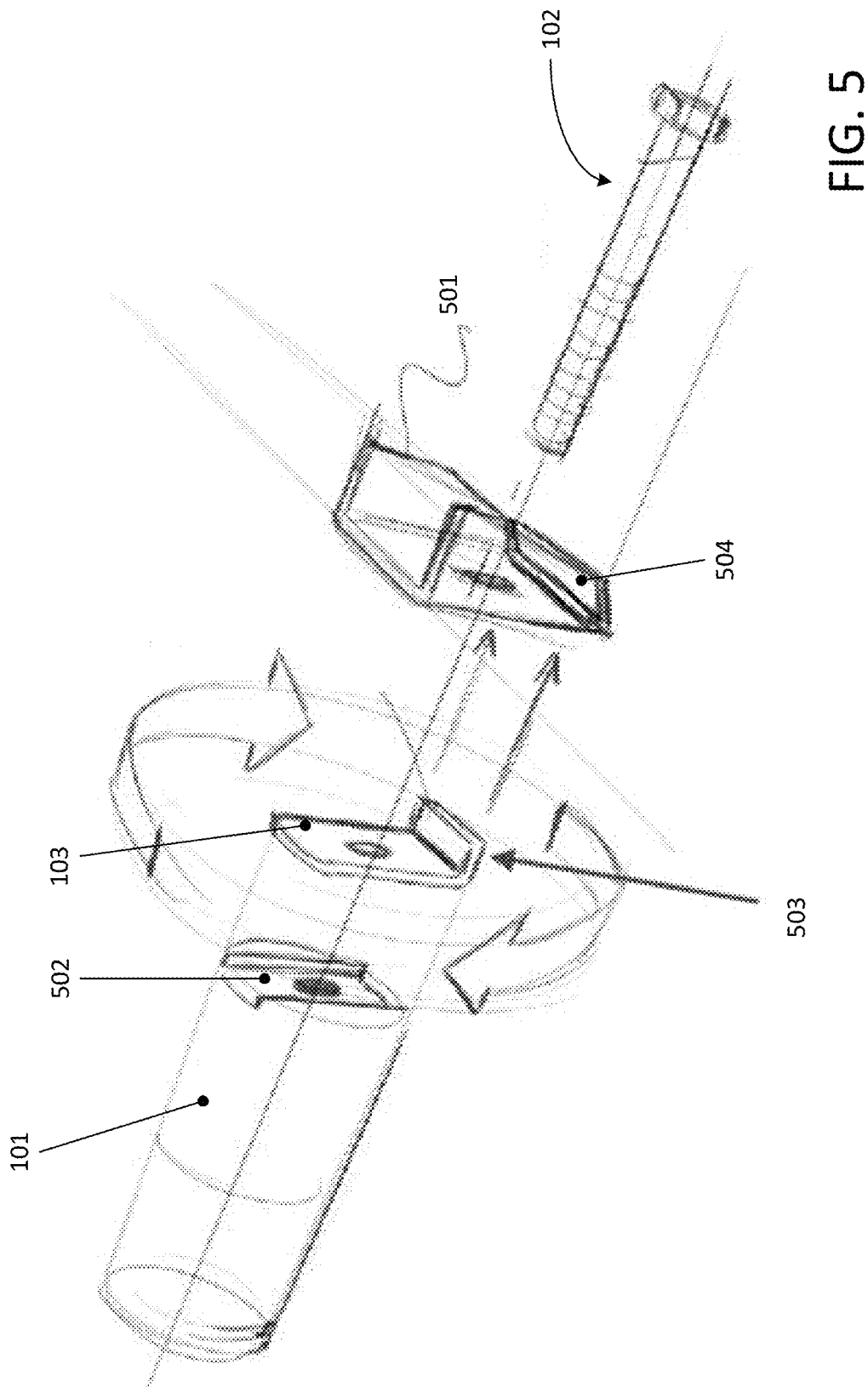
FIG. 5 is a representation of the components of the present design working together to inhibit rotation, including the L-bracket.

FIG. 5 illustrates a side view of the static peg and anti-rotational bracket aspect of the present design including bolt 102, a tab 501 provided on or as part of frame 302, an L-bracket 103, and a receiving indentation 502 in cylinder 101 to receive L-bracket 103. The horizontal element 503 of L-bracket 103 matches to tab 501, horizontally positioned under lip 504 of tab 501 prevents rotation of L-bracket 103, and positioning of L-bracket 103 in receiving indentation 502 prevents rotation of cylinder 101. Thus two anti-rotation points, features, or elements are provided in the design, the horizontal element 503 of L-bracket 103 and the sides of L-bracket 103 provide a secure connection preventing rotation.

Not shown in these views are the receiving elements that receive the bolt, which may be located inside the cylinder 101. Such receiving elements may include, for example, a nut possibly with a washer, or a set of threads sized to receive the bolt. Full attachment of the pegs to the vehicle using the components shown allows for the pegs to stay in place and not rotate.

Figure 6:
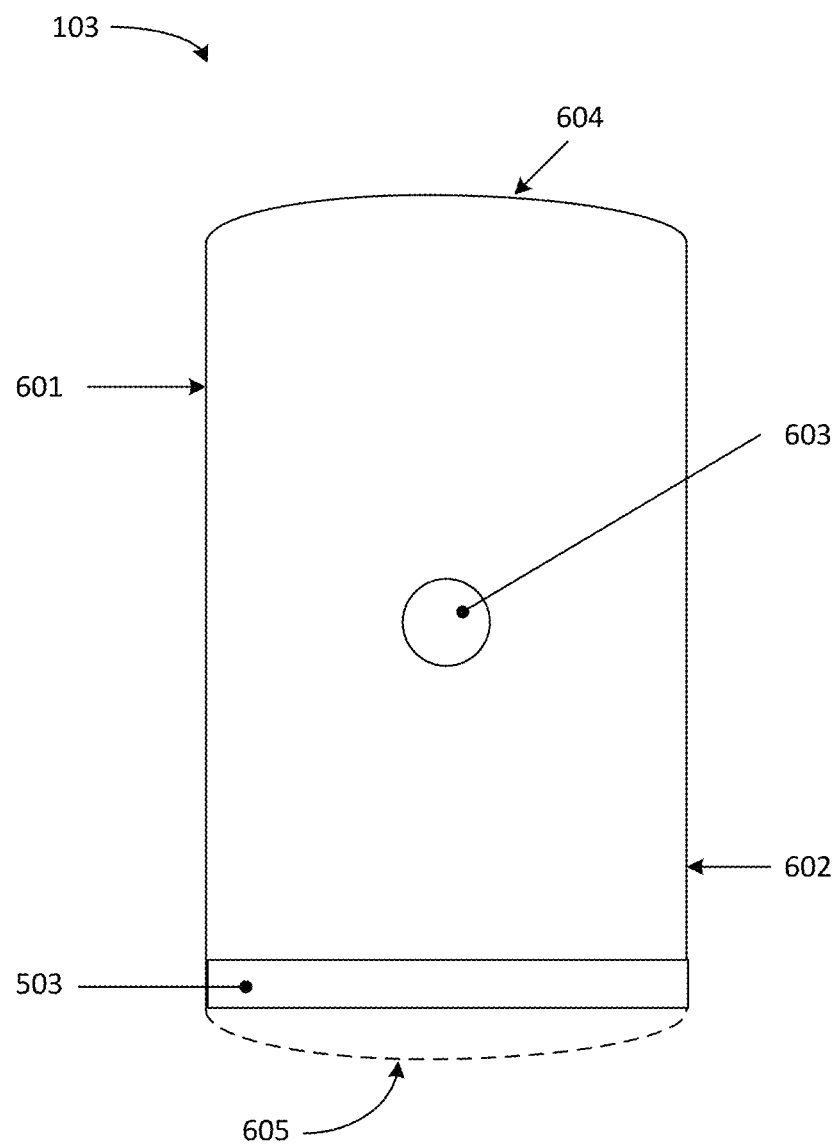
FIG. 6 is a front view of an L-bracket in accordance with one embodiment of the present design.

FIG. 6 is a front view of L-bracket 103 showing vertical sides 601 and 602, hole 603, and horizontal element 503. Curved upper edge 604 is provided to fit within the receiving indentation 502, and curved lower edge 605 may or may not be provided. In the arrangement shown, with curved lower edge 605 provided, a user may place cylinder 101 in either of two positions as the receiving indentation will accept the design at a first orientation or at a second orientation 180 degrees from the first orientation. Curvature, i.e. radius of curvature, of curved upper edge 604 and curved lower edge 605 may vary depending on the application and may differ from that presented in FIG. 6. If the orientation of the cylinder is of importance, curved lower edge 605 may be omitted and a small raised portion (not shown in FIG. 5) may be provided within receiving indentation 502 such that L-bracket 103 may only fit one way into the indentation provided on cylinder 101.

Figure 7:
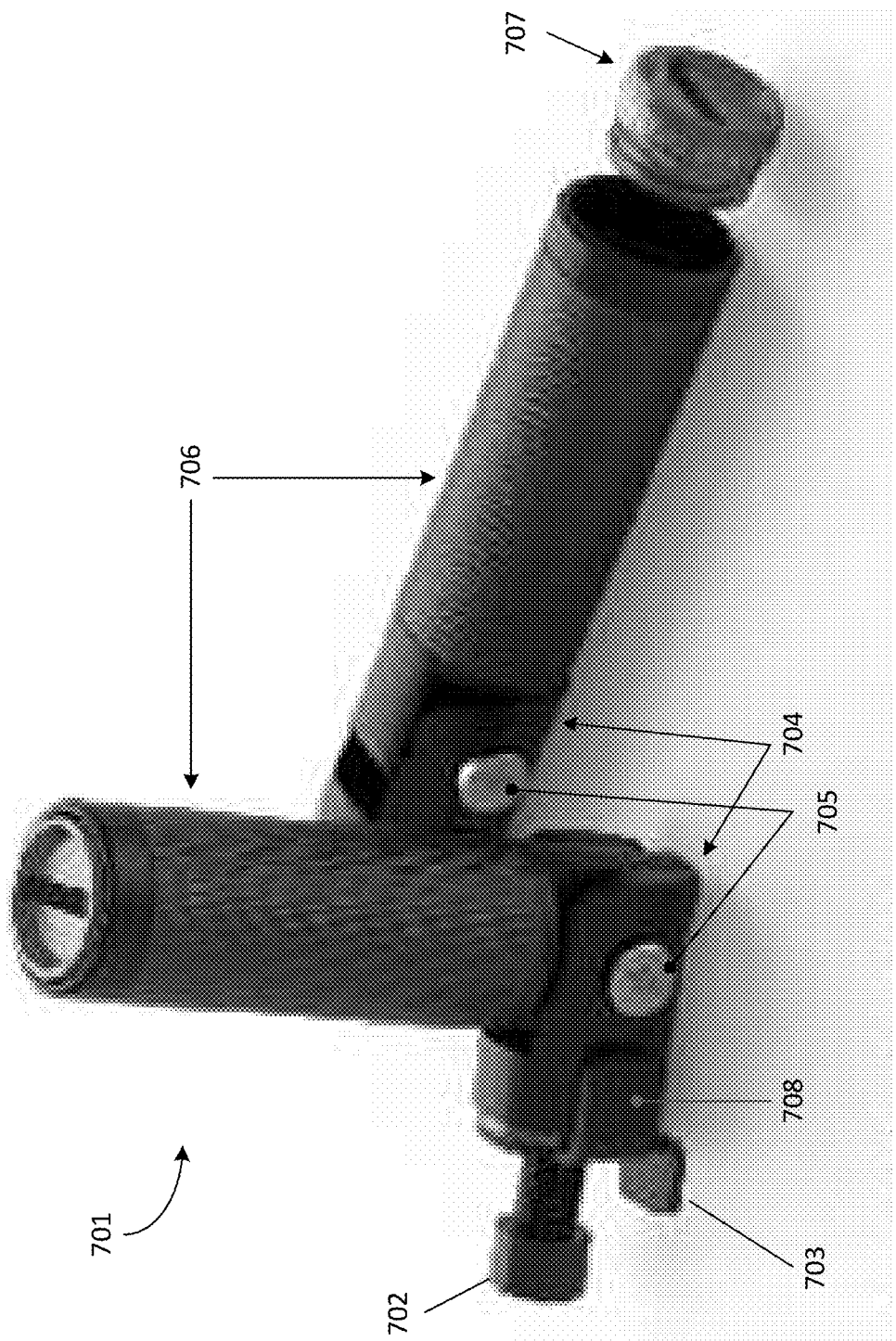
FIG. 7 shows a pair of folding stash pegs in accordance with one aspect of the present design.

FIG. 7 illustrates a set of folding stash pegs that may be employed with the current design. In one aspect, folding pegs may replace static or solid pegs similar to those shown in FIG. 1, or vice versa. Such changes to pegs, from folding to static or vice versa, may take place quickly and/or frequently, and ability to rapidly change pegs can be beneficial. The present design enables individuals to change pegs for a vehicle such as a bicycle or motorbike while on a road or trail using a wrench or similar tool.

The folding stash pegs of FIG. 7 include peg 701 having bolt 702 passing through L-bracket 703 and joining to first cylinder 704. Rotating joint 705 enables the folding and unfolding of the folding peg and provides a connection between first cylinder 704 and second cylinder 706. Rotating joint 705 may lock, or alternately hardware may be provided on first cylinder 704 and second cylinder 706 that allows for locking second cylinder 706 in an upright position and transitioning to a lowered position such as shown in the right representation of FIG. 7, such as internal pins, grooves, or ratchet/reset components. Cap 707 is shown in this view and may be provided with the static pegs of FIG. 1 and may screw in or be otherwise attached to second cylinder 706.

L-bracket 703 differs from L-bracket 103 in FIG. 7 in that side supports 708 are shown. Such side supports can benefit stability of first cylinder 704. Such an L-bracket 703 may be employed, or in certain instances the L-bracket 103 of FIG. 1 may be employed with the folding stash pegs of FIG. 7.

In total, the design of FIG. 7 folds up when not in use and stays folded in an upright position. The presence of cap 707 allows for the user to maintain objects inside the second cylinder 706 and can be readily released or unlocked. In one embodiment, cap 707 may include a slot allowing for turning using a credit card or flat head screwdriver.

Figure 8:
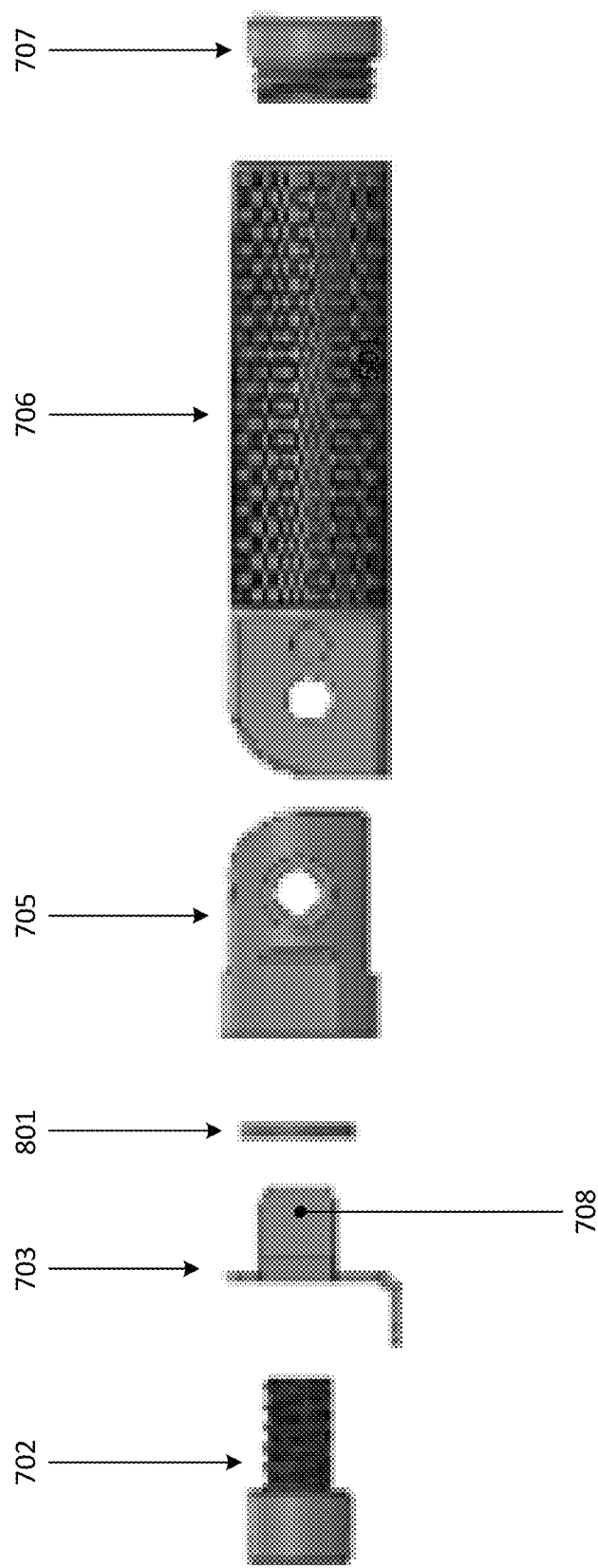
FIG. 8 is a side view of the components of the present folding stash peg aspect of the design.

FIG. 8 shows an exploded view of one folding stash peg, including bolt 702, L-bracket 703, an optional washer 801, first cylinder 704, second cylinder 705, and cap 707. Side support 708 is also shown in this view.

The presence of the anti-rotation L-bracket and the forming of the indentation in the receiving component as well as the lower element of the bracket fitting with the vehicle or a component attached to the vehicle. Such a design prevents the rotation of the foot pegs and allows for rapid changing of the pegs when desired.

Thus according to one aspect of the present design, there is provided an anti-rotation bracket configured to engage a horizontal indented vehicle component and fit within an indentation formed within a component attachable to the vehicle. The anti-rotation bracket comprises a flat region having an opening formed therein, the flat region sized to fit within the indentation and an extension integrally formed at a right angle to the flat region, the extension sized to engage the horizontal indented vehicle component such that the extension abuts the horizontal indented vehicle component, thereby inhibiting rotation of the anti-rotation bracket.

According to another aspect, there is provided a vehicle comprising a horizontal indented vehicle component and an anti-rotation bracket configured to engage the horizontal indented vehicle component and fit within an indentation formed within a component attachable to the vehicle. The anti-rotation bracket comprises a flat region having an opening formed therein, the flat region sized to fit within the indentation and an extension integrally formed at a right angle to the flat region, the extension sized to engage the horizontal indented vehicle component such that the extension abuts the horizontal indented vehicle component.

According to a further aspect, there is provided an anti-rotation bracket configured to engage a horizontal indented vehicle component and fit within an indentation formed within a cylindrical component attachable to the vehicle. The anti-rotation bracket comprises a flat region having an opening formed therein, the flat region sized to fit within the indentation and an extension integrally formed at a right angle to the flat region, the extension sized to engage the horizontal indented vehicle component such that the extension abuts the horizontal indented vehicle component, thereby inhibiting rotation of the anti-rotation bracket. Securing the anti-rotation bracket within the indentation and proximate the horizontal indented vehicle component inhibits rotation of the cylindrical component.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An anti-rotation bracket configured to engage a horizontal indented vehicle component and fit within an indentation formed within a component attachable to a vehicle, the anti-rotation bracket comprising:
a flat region having parallel edges and an opening formed therein, the flat region sized to fit within the indentation; and
an extension integrally formed at a right angle to the flat region, thereby forming an L-shape with the parallel edges of the flat region, the extension sized to engage the horizontal indented vehicle component such that the extension abuts the horizontal indented vehicle component, thereby inhibiting rotation of the anti-rotation bracket.

2. The anti-rotation bracket of claim 1, wherein the flat region comprises straight sides and at least one of a curved upper edge and a curved lower edge.

3. The anti-rotation bracket of claim 1, wherein the indentation comprises a second opening formed therein, the horizontal indented vehicle component comprises a third opening formed therein, and the opening, second opening, and third opening are configured to receive a bolt serving to join the anti-rotation bracket, the horizontal indented vehicle component, and the component together.

4. The anti-rotation bracket of claim 1, wherein the vehicle comprises one of a bicycle, a motorbike, and a motorcycle, and the component comprises a foot peg.

5. The anti-rotation bracket of claim 1, wherein the horizontal indented vehicle component comprises hardware attached to the vehicle.

6. The anti-rotation bracket of claim 1, wherein the indentation is formed on a cylindrical accessory and the indentation comprises two horizontal sides and at least one edge curved in shape.

7. The anti-rotation bracket of claim 6, wherein the cylindrical accessory comprises a cap provided on a distal end of the cylindrical accessory.

8. A vehicle comprising:
a horizontal indented vehicle component; and
an anti-rotation bracket configured to engage the horizontal indented vehicle component and fit within an indentation formed within a component attachable to the vehicle;
wherein the anti-rotation bracket comprises:
a flat region having parallel edges and an opening formed therein, the flat region sized to fit within the indentation; and
an extension integrally formed at a right angle to the flat region, thereby forming an L-shape with the edges of the flat region, the extension sized to engage the horizontal indented vehicle component such that the extension abuts the horizontal indented vehicle component.

9. The anti-rotation bracket of claim 8, wherein the flat region comprises straight sides and at least one of a curved upper edge and a curved lower edge.

10. The anti-rotation bracket of claim 8, wherein the indentation comprises a second opening formed therein, the horizontal indented vehicle component comprises a third opening formed therein, and the opening, second opening, and third opening are configured to receive a bolt serving to join the anti-rotation bracket, the horizontal indented vehicle component, and the component together.

11. The anti-rotation bracket of claim 8, wherein the vehicle comprises one of a bicycle, a motorbike, and a motorcycle, and the component comprises a foot peg.

12. The anti-rotation bracket of claim 8, wherein the horizontal indented vehicle component comprises hardware attached to the vehicle.

13. The anti-rotation bracket of claim 8, wherein the indentation is formed on a cylindrical accessory and the indentation comprises two sides and at least one edge curved in shape.

14. The anti-rotation bracket of claim 13, wherein the cylindrical accessory comprises a cap provided on a distal end of the cylindrical accessory.

15. An anti-rotation bracket configured to engage a horizontal indented vehicle component and fit within an indentation formed within a cylindrical component attachable to a vehicle, the anti-rotation bracket comprising:
a flat region having parallel edges and an opening formed therein, the flat region sized to fit within the indentation; and
an extension integrally formed at a right angle to the flat region, thereby forming an L-shape with the edges of the flat region, the extension sized to engage the horizontal indented vehicle component such that the extension abuts the horizontal indented vehicle component, thereby inhibiting rotation of the anti-rotation bracket;
wherein securing the anti-rotation bracket within the indentation and proximate the horizontal indented vehicle component inhibits rotation of the cylindrical component.

16. The anti-rotation bracket of claim 15, wherein the flat region comprises straight sides and at least one of a curved upper edge and a curved lower edge.

17. The anti-rotation bracket of claim 15, wherein the indentation comprises a second opening formed therein, the horizontal indented vehicle component comprises a third opening formed therein, and the opening, second opening, and third opening are configured to receive a bolt serving to join the anti-rotation bracket, the horizontal indented vehicle component, and the component together.

18. The anti-rotation bracket of claim 15, wherein the vehicle comprises one of a bicycle, a motorbike, and a motorcycle, and the cylindrical component comprises a foot peg.

19. The anti-rotation bracket of claim 15, wherein the horizontal indented vehicle component comprises hardware attached to the vehicle.

20. The anti-rotation bracket of claim 15, wherein the cylindrical component comprises a cap provided on a distal end of the cylindrical component.

* * * * *